United States Patent [19]

Kelsey

[11] Patent Number: 5,143,992
[45] Date of Patent: Sep. 1, 1992

[54] METHATHESIS POLYMERIZABLE ADDUCTS OF A DIVINYLCYCLOHYDROCARBON AND CYCLOPENTADIENE

[75] Inventor: Donald R. Kelsey, Fulshear, Tex.

[73] Assignee: Shell Oil Company, Houston, Tex.

[21] Appl. No.: 729,262

[22] Filed: Jul. 12, 1991

[51] Int. Cl.$^5$ .............................................. C08G 61/08
[52] U.S. Cl. ...................................... 526/283; 526/75; 526/133; 526/166; 526/169; 526/282; 526/308; 585/22; 585/360; 585/361
[58] Field of Search ................. 526/75, 133, 166, 169, 526/282, 283, 308; 585/22, 360, 361

[56] References Cited

U.S. PATENT DOCUMENTS

| | | | |
|---|---|---|---|
| 2,957,035 | 10/1960 | Benson | 526/308 X |
| 3,746,695 | 7/1973 | Ofstead | 526/75 X |
| 3,933,778 | 1/1976 | Pampus et al. | 260/93.1 |
| 4,127,497 | 11/1978 | Reierson | 526/283 X |
| 4,584,425 | 4/1986 | Tom | 585/827 |
| 4,701,501 | 10/1987 | Kordomenos et al. | 525/449 |
| 4,729,976 | 3/1988 | Sjardijn et al. | 502/102 |
| 4,810,762 | 3/1989 | Sjardin et al. | 526/166 |
| 4,861,848 | 8/1989 | Basset et al. | 526/169 |
| 4,899,005 | 2/1990 | Lane et al. | 585/360 |

FOREIGN PATENT DOCUMENTS 313838 5/1989 European Pat. Off. .

*Primary Examiner*—Fred Teskin

[57] ABSTRACT

An improved thermoset polymer having good mechanical properties and no detectable dicyclopentadiene odor is obtained by the ring-opening polymerization of a novel mixture of adducts comprising divinyl cyclohydrocarbon compound, such as 3,5-divinylcyclopentene and cyclopentadiene, optionally with added cycloolefinic compound, such as dicyclopentadiene, at polymerization conditions in the presence of an olefin metathesis catalyst.

28 Claims, No Drawings

METHATHESIS POLYMERIZABLE ADDUCTS OF A DIVINYLCYCLOHYDROCARBON AND CYCLOPENTADIENE

FIELD OF THE INVENTION

The present invention relates to a process for the production of polymer products derived from a divinyl cyclohydrocarbon compound and cyclopentadiene. More particularly, the invention relates to the ring-opening or metathesis polymerization of a mixture of adducts of a divinyl cyclohydrocarbon compound and cyclopentadiene, in the optional presence of added cycloolefinic compound such as dicyclopentadiene.

BACKGROUND OF THE INVENTION

The production of thermoset polymers by the ring-opening or metathesis polymerization of cyclic olefins is well known in the art. Numerous patents and literature references, both U.S. and foreign, relate to the ring-opening polymerization of dicyclopentadiene in the presence of a variety of olefin metathesis catalyst systems. One such catalyst system is disclosed by Sjardijn et al, U.S. Pat. No. 4,810,762, wherein substituted phenolic tungsten halides are employed with triorganotin hydrides. In copending U.S. patent application Ser. No. 278,101, filed Nov. 30, 1988, there is disclosed a catalyst system which comprises a phenol-treated tungsten salt such as the halide or oxyhalide employed with a tin or aluminum compound and a boron halide promoter. Bulk polymerization of dicyclopentadiene in the presence of a catalyst system of this type is illustrated by U.S. Pat. No. 4,729,976.

The ring-opening polymerization of dicyclopentadiene and other cyclic unsaturated compounds finds particular application in reaction injection molding (RIM) processes wherein monomer solutions of the catalyst system components are mixed and injected into a mold where polymerization takes place to form a solid, infusible polymeric product. However, the polymerization of dicyclopentadiene by such a process suffers from several disadvantages. If the polymerization is not virtually quantitative, there will be unreacted monomer in the polymer thermoset product and the molded article will have a most disagreeable dicyclopentadiene odor. This odor greatly limits the applications in which the polymer product can be used. A second difficulty arises from the relatively low and less than desired glass transition temperature for the polymerized dicyclopentadiene product. A typical glass transition temperature (Tg) is in the 130° C.-140° C. range. This glass transition temperature also limits the applications for the polymer product.

It is also known to copolymerize polycyclic polyolefin monomers such as cyclopentadiene trimers, tetramers and higher oligomers with other cycloolefins to obtain higher glass transition temperatures. In European Patent Application 313,838 there is disclosed a process of producing ring-opening polymerization products of higher glass transition temperatures by polymerizing cycloolefin monomers such as norbornene or tetracyclododecene in the presence of from about 5% to about 45% of a resinous cycloolefin formed from cyclopentadiene trimers and higher oligomers which may also contain common unsaturates such as styrene, propylene, butadiene, vinylcyclohexene and isopentene. These resinous cycloolefins are produced by heating dicyclopentadiene in the optional presence of the more common olefin. The polymer products of the European Patent Application have relatively high glass transition temperatures, at times as high as 210° C. or higher, but are difficult to prepare. Lane et al, U.S. Pat. No. 4,899,005, use as feed for a ring-opening polymerization a mixture of polycyclic olefins which may contain small amounts, i.e., less than 20%, of α-olefins such as 1-hexene, styrene or 4-vinylcyclohexene. A copending U.S. patent application Ser. No. 712,296, now U.S. Pat. No. 5,095,082, filed Jun. 10, 1991, discloses the ring-opening polymerization of mixtures of adducts of 4-vinylcyclohexene and cyclopentadiene in the optional presence of dicyclopentadiene. Numerous other references illustrate ring-opening or metathesis polymerization processes involving other and frequently more complex cycloolefins. It would be of advantage to provide a process for the ring-opening or metathesis polymerization of norbornene-type compounds which is easy and economical to operate and where the products have a relatively high glass transition temperature and no detectable dicyclopentadiene odor.

SUMMARY OF THE INVENTION

The present invention provides a process for the ring-opening polymerization of certain cyclopentadiene adducts in the optional presence of other polycyclic olefins such as dicyclopentadiene, to produce novel metathesis polymers of relatively high glass transition temperature and no detectable dicyclopentadiene odor. More particularly, the invention provides for the ring-opening polymerization of adducts of a divinyl cyclohydrocarbon compound and cyclopentadiene, optionally in the presence of added cycloolefinic compound such as dicyclopentadiene.

DESCRIPTION OF THE INVENTION

The process of the invention comprises the ring-opening polymerization of a mixture of cycloolefinic adducts containing a major proportion of Diels-Alder adducts of divinyl cyclohydrocarbons, e.g., 3,5-divinylcyclopentene, and cyclopentadiene and also a proportion of cyclopentadiene oligomers. Trace amounts of unreacted adduct precursors and dicyclopendadiene may also be present in the mixture but no substantial amount of these compounds will be present. This adduct mixture, optionally in the presence of added cycloolefinic compound such as dicyclopentadiene, is contacted with an olefin metathesis catalyst system to effect ring-opening polymerization. The polymer product is a hard, infusible, crosslinked polymeric product of relatively high glass transition temperature and no detectable dicyclopentadiene odor.

The major component of the mixture to be polymerized according to the process of the invention is a mixture of Diels-Alder adducts of a divinyl cyclohydrocarbon and dicyclopentadiene. The adduct mixture is produced by contacting the divinyl cyclohydrocarbon and dicyclopentadiene under suitable reaction conditions. Without wishing to be bound by any particular theory, it appears likely that under the elevated temperature of adduct formation the dicyclopentadiene "cracks" or "de-dimerizes" to produce cyclopentadiene which reacts in situ with the divinyl cyclohydrocarbon.

In the process of the invention, the divinyl cyclohydrocarbon reactant is a cyclic hydrocarbon compound of up to 20 carbon atoms containing two vinyl groups as substituents on carbon atoms at least one carbon atom apart on an aliphatic ring system of from 5 to 10 carbon atoms and of 1 ring or of 2 fused rings. Thus, a variety of divinyl cyclohydrocarbons are useful in the process of the invention, but preferred are the divinyl cyclohydrocarbons of the formula

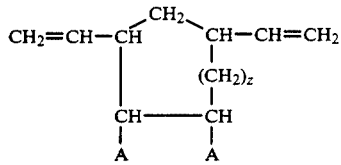
(I)

wherein z is 0 or 1 and A individually is hydrogen, or alkyl of from 1 to 4 carbon atoms inclusive, or the two A groups taken together form a second valence bond between the two carbon atoms to which they are attached or a divalent linking group of from 3 to 4 carbon atoms in the bridge and up to 1 carbon-carbon double bond. Illustrative of such preferred divinyl cyclohydrocarbons are 3,5-divinylcyclopentene, 1,3-divinylcyclopentane, 1,3-divinyl-4-methylcyclopentane, 1,3-divinylcyclohexane, 3,5-divinylcyclohexene, 2,4-divinylbicyclo[3.3.0]oct-6-ene and 2,4-divinylbicyclo[4.3.0]nonane. Particularly preferred as the divinyl cyclohydrocarbon compound are 3,5-divinylcyclopentene, 1,3-divinylcyclopentane and 2,4-divinylbicyclo[3.3.0]oct-6-ene.

The adducts of the divinyl cyclohydrocarbon compound are quite complex and difficult to illustrate, but the adducts are Diels-Alder adducts of conventional type resulting from the reaction of the divinyl hydrocarbon compound and cyclopentadiene. In the case of the preferred 3,5-divinylcyclopentene, the adducts with cyclopentadiene are illustrated by but not limited to adducts of the formulas which follow.

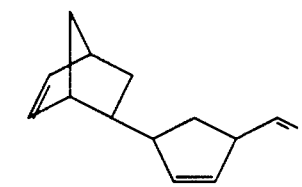
(II)

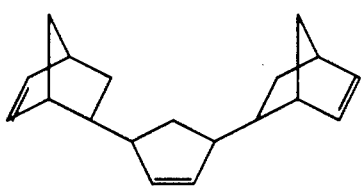
(III)

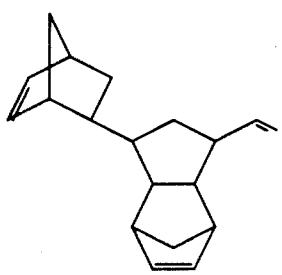
(IV)

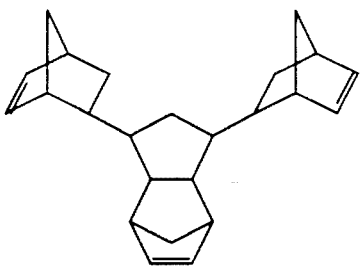
(V)

The adduct represented by formula II is a 1:1 molar adduct of 3,5-divinylcyclopentene and cyclopentadiene whereas the adducts represented by formulas III and IV are 1:2 adducts and formula V represents a 1:3 adduct. Corresponding adducts are produced from reaction of other divinyl cyclohydrocarbons. To produce the major component of the mixture to be polymerized according to the process of the invention, it is preferred that the molar ratio of divinyl cyclohydrocarbon to dicyclopentadiene is from about 0.5 to about 2, more preferably from about 0.75 to about 1.5. The resulting adduct mixture to be polymerized contains substantial proportions of 1:1, 1:2 and 1:3 molar adducts as well as trimers, tetramers, pentamers and higher oligomers of cyclopentadiene.

The divinyl cyclohydrocarbons are known compounds or are obtained by known methods. The dicyclopentadiene source of cyclopentadiene is also well known and is often obtained as a by-product of olefin crackers. Dicyclopentadiene exists in an endo form and an exo form but most commercial dicyclopentadiene is of the endo form. Either isomer, or mixture of isomers, is suitable in the present process. Particularly useful is a commercially available technical grade of dicyclopentadiene having a purity of about 83%-95%. This technical grade is easily processed by virtue of it being liquid at ambient temperature whereas pure endo-dicyclopentadiene melts at about 32° C. Because of the reactive character of the monomers and/or adduct products, it is desirable that the adduct formation is conducted in an inert reaction environment and traces of reactive materials such as oxygen are preferably excluded. On occasion, free radical scavengers are also usefully provided to the reaction mixture to prevent undesirable reaction. The adduct formation is accomplished at a reaction temperature above about 160° C. and preferably from about 180° C. to about 260° C. At these temperatures the dicyclopentadiene undergoes a reverse Diels-Alder reaction to produce cyclopentadiene which reacts in situ with the divinyl cyclohydrocarbon which, when 3,5-divinylcyclopentene, produces adducts of the types illustrated by the above formulas II-V. The reaction time should be chosen to provide an adduct mixture of moderate viscosity, particularly when the adduct mixture is to be employed in a RIM polymerization process. Preferably, the viscosity of the adduct mixture should be lower than about 1000 cps. Although the use of a reaction diluent is not precluded, the preferred adduct formation is conducted in the substantial absence of reaction diluent.

Subsequent to reaction, the adduct mixture is purified to remove unreacted starting material, any water or added free radical scavenger, and low molecular weight products by conventional methods such as treatment with molecular sieves or distillation at reduced pressure. The adduct mixture is not typically separated further and is used as produced. The adduct mixture contains 1:1 molar adducts of divinyl cyclohydrocarbon compound and cyclopentadiene, 1:2 molar adducts and 1:3 molar adducts as well as Diels-Alder oligomers of cyclopentadiene. An illustrative adduct mixture contains at least 30% by weight and preferably at least about 60% by weight of total adducts. Although the proportions of the various types of adducts is variable, the 1:1 molar adducts comprise from about 20% by weight to about 70% by weight of these adducts, the 1:2 adducts from about 20% by weight to about 50% by weight with the 1:3 molar adducts comprising the remainder. The typically minor proportion of the adduct mixture to be polymerized is an oligomer mixture of cyclopentadiene oligomers of three or more units. Of this oligomer mixture, cyclopentadiene trimers are from about 30% by weight to about 95% by weight of the total oligomers, cyclopentadiene tetramers from about 5% by weight to about 50% by weight with the remainder comprising cyclopentadiene pentamers and higher oligomers. The weight ratio of adducts to cyclopentadiene oligomers ranges from about 1 to about 50, but preferably is from about 2 to about 25.

The adduct mixture as described above, in the optional presence of dicyclopentadiene, is subjected to a ring-opening or metathesis polymerization in the presence of an olefin metathesis catalyst. A variety of olefin metathesis catalyst systems are known in the art and are usefully employed in the process of the invention. Pampus et al, U.S. Pat. No. 3,933,788, teaches the use of a tungsten salt, certain halogenated alcohols and an organoaluminum compound as a metathesis catalyst system. The process of Bassett et al, U.S. Pat. No. 4,861,848, employs as catalyst a tungsten halide substituted by at least 2 alkyl- or alkoxy-substituted phenoxide moieties. The above European Patent Application 313,838 teaches molybdenum and tungsten salts, particularly employed in conjunction with alkylaluminum halides. Sjardijn et al, U.S. Pat. No. 4,810,762, use a catalyst system comprising a phenolic-substituted tungsten halide and a trialkyltin halide. Copending U.S. patent application Ser. No. 278,101 discloses a similar catalyst system employed in conjunction with a boron halide promoter. These disclosures are incorporated herein by reference. The preferred olefin metathesis catalyst of the invention comprises a hexavalent tungsten halide with 0 or 1 oxygen substituents and two alkylphenoxy substituents which is employed in conjunction with a triorganotin halide and, optionally, a boron halide promoter. One class of such tungsten halides is represented by the formula

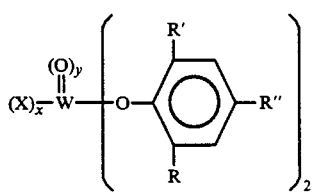

(VI)

where R independently is alkyl of up to 10 carbon atoms, preferably branched on the alpha carbon atom, R' independently is hydrogen or R, and R" independently is hydrogen or R. The X substituent independently is halo, i.e., fluoro, chloro, bromo or iodo, but preferably is middle halogen chloro or bromo, x is 2 or 4 and y is 0 or 1 with the sum of x+2y being 4.

In the above formula VI, R is suitably methyl, ethyl, propyl, isopropyl, sec-butyl, t-butyl, t-amyl, 2-methyl-2-hexyl, n-octyl or 3-ethyl-3-hexyl but is preferably alkyl of from 3 to 6 carbon atoms inclusive branched on the carbon to which the R group is attached to the aromatic ring and most preferably, is isopropyl. R' is suitably hydrogen but is preferably R, and R" is suitably R but is preferably hydrogen. Illustrative phenoxy groups as depicted in the above formula VI are 2,6-diisopropylphenoxy, 2,6-di-sec-butylphenoxy, 2,6-di-t-butyl-4-methylphenoxy, 2-t-butyl-6-t-amylphenoxy, 2,6-diisopropyl-4-methylphenoxy, 2-isopropyl-4-ethylphenoxy and 2-t-butyl-4-hexylphenoxy. The preferred alkylphenoxy group of the above formula VI is 2,6-diisopropylphenoxy.

The tungsten-containing catalyst system component will be a halide or an oxydihalide. Such components are di(phenoxy-substituted)tungsten halides or oxydihalides wherein each phenoxy group is substituted phenoxy as described above. Particularly preferred catalyst system components are the di(phenoxy-substituted)tungsten oxydichlorides.

The triorganotin hydride catalyst system component is a trialkyltin hydride or triaryltin hydride wherein each alkyl or aryl independently has up to 10 carbon atoms inclusive. Illustrative of such tin hydrides are triethyltin hydride, tripropyltin hydride, tributyltin hydride, trioctyltin hydride, dimethylhexyltin hydride, ethyldipropyltin hydride, triphenyltin hydride, tritolyltin hydride and diphenylxylyltin hydride. The trialkyltin hydrides are preferred, particularly those tin hydrides wherein each alkyl is straight-chain lower alkyl of from 3 to 6 carbon atoms. Especially preferred as the trialkyltin hydride is tri-n-butyltin hydride. The di(phenoxy-substituted)tungsten halide and the triorganotin hydride are suitably employed in molar ratios from about 1:1 to about 1:15 but preferably in molar ratios from about 1:2 to about 1:8.

The metathesis catalyst system is supplied to the mixture to be polymerized in a catalytic quantity. Quantities of the catalyst system from about 0.005% by weight to about 10% by weight based on the adduct mixture are suitable. Quantities of catalyst system from about 0.05% by weight to about 2% by weight on the same basis are preferred.

It is useful, on occasion, to provide to the catalyst system a boron halide promoter, e.g., boron trihalides, boron trihalide complexes, organoboron halides and tetrahaloborates. Suitable boron halides are illustrated by boron trifluoride, boron tribromide, boron trifluoride diethyl ether complex, boron trifluoride dibutyl ether complex, methylboron difluoride, phenylboron dichloride, ammonium tetrafluoroborate, boron dichloride dimethylsulfide complex and boron trifluoride alcohol complexes. Particularly useful are boron trifluoride and its diethyl ether and dibutyl ether complexes. The use of boron halide promoter is optional and is not required but the promoter can be present in amounts up to about 10 moles of promoter per mole of tungsten compound. When present, amounts of the boron halide from about 0.05 mole to about 2 moles per mole of tungsten compound are preferred.

The ring-opening polymerization of the invention is conducted by contacting the divinyl cyclohydrocarbon/cyclopentadiene adduct mixture, any additionally provided cycloolefinic compound and the metathesis catalyst system at polymerization temperature. It is useful on occasion to provide a reaction diluent in order to solubilize the catalyst components. In such an embodiment, at least one catalyst system component would be provided with each of two portions of the reaction diluent. In the preferred embodiment, however, no added reaction diluent is employed and a portion of the adduct mixture is used to introduce the catalyst system components to the polymerization mixture. To effect the polymerization process, the adduct mixture, any provided cycloolefinic compound such as dicyclopentadiene, and the metathesis catalyst system are contacted at a polymerization temperature from about 25° C. to about 200° C. with polymerization temperatures from about 75° C. to about 160° C. being preferred. The polymerization pressure is that pressure required to maintain the polymerization mixture in a non-gaseous state. Such pressures will vary with the reaction temperature but pressures up to about 5 atmospheres are typical and frequently ambient pressure is suitable and is preferred.

In an illustrative polymerization, the reactants and the catalyst system are mixed at a relatively low temperature at which polymerization at a rapid rate does not occur. This relatively slow initial reaction rate permits efficient mixing and other processing of the reaction mixture as well as the incorporation of fillers, reinforcements, anti-oxidants, stabilizers, pigments, elastomers or other materials supplied to influence the properties of the polymerization product. The polymerization mixture is then raised to a more elevated polymerization temperature, at least in part with the aid of a reaction exotherm which follows, and polymerization is rapidly completed.

A particularly contemplated embodiment of the polymerization process is in a reaction injection molding (RIM) process. Because of the initial relatively low viscosity of the polymerization mixture and the length of time before the reaction exotherm takes place, the reactant mixture and catalyst system can be mixed and transferred to a suitable mold including those molds for large castings of intricate shape. In a typical RIM process, the time prior to reaction exotherm is about 2 minutes but once the polymerization is initiated as evidenced by the exotherm the polymerization process is quite rapid and is frequently complete in a time from about 10 seconds to about 1 minute.

The polymer product of the invention is a hard, infusible, highly crosslinked polymerization product of the divinyl cyclohydrocarbon/cyclopentadiene adduct mixture. The product is characterized by good physical properties including a relatively high glass transition temperature and by the absence of a detectable dicyclopentadient odor. The polymer is useful in structural composites such as parts for automotive applications and in electronic applications such as circuit boards and as encapsulating material.

The invention is further illustrated by the following Illustrative Embodiments which should not be regarded as limitations.

ILLUSTRATIVE EMBODIMENT I

To a small autoclave which had been degassed with nitrogen were charged 5 g (41.6 mmol) of cis-3,5-divinylcyclopentene, 8.25 g (62.4 mmol) of distilled dicyclopentadiene and about 0.01 g of t-butylcatechol. The autoclave and contents were heated to at least about 180° C. and an initial pressure of 60-80 psi for 17.5 hours. The mixture was cooled and then rinsed from the autoclave with cyclohexane and filtered to remove some solid material. The cyclohexane solution was analyzed by gas chromatography and found to contain 6% divinylcyclopentene, 8% dicyclopentadiene, 17% of mono-adducts of divinylcyclopentene and cyclopentadiene, 17% cyclopentadiene trimers, 18% of 1:2 adducts of divinylcyclopentene and cyclopentadiene, 7% cyclopentadiene trimers and about 6% of compounds of higher molecular weight. The cyclohexane solution was passed through a column packed with alumina to remove the t-butylcatachol, and dried over 3 Å sieves. The cyclohexane was removed by vacuum distillation to afford the adduct mixture which was viscous and cloudy at room temperature but a nearly clear, flowing liquid at 50° C.

ILLUSTRATIVE EMBODIMENT II

The procedure of Illustrative Embodiment I was repeated except that 7.66 g (63.7 mmol) of divinylcyclopentene and 10.95 g (82.8 mmol) distilled dicyclopentadiene were used and the mixture was heated to at least 180° C. for 17 hours. The resulting product mixture, when diluted with cyclohexane, contained little solid material. After the cyclohexane solution was passed through the packed column, dried, and the cyclohexane and unreacted divinylcyclopentene removed by distillation, a total of 12 g of product was obtained. A gas chromatographic analysis of this product indicated about 0.5% divinylcyclopentene, 1.2% dicyclopentadiene, 20.5% of mono-adducts of divinylcyclopentene and cyclopentadiene, 19.2% of cyclopentadiene trimer, 29.4% 1:2 adducts of divinylcyclopentene and cyclopentadiene, 7.4% cyclopentadiene tetramers and 18.3% of 1:3 adducts of divinylcyclopentene and cyclopentadiene, and 1.8% cyclopentadiene pentamers.

ILLUSTRATIVE EMBODIMENT III

A 5 milliliter serum bottle was charged under a nitrogen atmosphere with 1.00 g of dry, degassed monomer mixture prepared by the procedure of Illustrative Embodiment I, 0.0013 g (0.007 mmol) of boron trifluoride dibutyl ether complex and 0.268 g (0.030 mmol) of a 7% solution of bis(2,6-diisopropylphenoxy)tungsten oxydichloride in dry dicyclopentadiene. To the stirred material was added by syringe 0.035 g (0.120 mmol) of tributyltin hydride. After stirring for several minutes, the vial (containing a thermocouple) was transferred to an oil bath at 120° C. The reaction mass gelled quickly and the internal temperature of the reaction mass reached at least 142° C. within 0.3 minutes. The vial was left in the bath for 40 minutes and then cooled to obtain a hard, polymerized mass with no detectable dicyclopentadiene odor.

The polymer exhibited a swell in toluene of 69% (24 hours at room temperature) which indicated a crosslinked material. Gas chromatographic analysis of the toluene extract using beta-pinene as a standard showed less than 0.1% unreacted dicyclopentadiene and less than 4.2% total extractable components. Differential scanning calorimetry indicated a glass transition temperature of 157° C.

ILLUSTRATIVE EMBODIMENT IV

The procedure of Illustrative Embodiment III was substantially repeated using 1.00 g of the product of Illustrative Embodiment II, 0.030 g (0.046 mmol) of the tungsten compound (not dissolved in dicyclopentadiene), 0.001 g (0.005 mmol) boron trifluoride dibutyl ether complex and 0.035 g (0.120 mmol) tributyltin hydride. The polymerization mixture set to a hard mass in less than 1 minute after being placed in the oil bath. The reaction vial was removed from the bath after about 45 minutes.

The polymer swell in toluene (24 hours at room temperature) was 35%. Gas chromatographic analysis of the toluene extract showed no detectable dicyclopentadiene and less than 3.5% of extractable components. Differential scanning calorimetry analysis was unable to detect a glass transition temperature between 30° C. and 250° C.

ILLUSTRATIVE EMBODIMENT V

By a procedure substantially similar to that of Illustrative Embodiment I, 12.2 g of distilled 1,3-divinylcyclopentane was heated with 17.2 g of dicyclopentadiene at 220° C. for 4 hours. Gas chromatographic analysis of the resulting adduct mixture indicated an 83% conversion of the divinylcyclopentane to give an adduct mixture containing a 7.6 ratio by weight of adducts of divinylcyclopentane and dicyclopentadiene to dicyclopentadiene oligomers. The adduct mixture was a clear, low viscosity liquid free of solids.

ILLUSTRATIVE EMBODIMENT VI

A 1.5 g portion of the adduct mixture produced from 1,3-divinylcyclopentane and dicyclopentadiene according to the general procedure of Illustrative Embodiment V was contacted with 0.01 mmole of bis(diisopropylphenoxy)tungsten oxydihalide and 0.041 mmole of tributyltin hydride in a degassed serum bottle under nitrogen. The resulting mixture was transferred immediately to an aluminum mold under nitrogen which had been heated to 100° C. The mold and contents were then heated at 100° C. for 15 minutes to complete polymerization. The hard polymer product which resulted was found by dynamic mechanical thermal analysis to have a glass transistion temperature of approximately 179° C. The polymer had a swell in toluene (24 hours at room temperature) of 44%. Gas chromatographic analysis of the toluene extract showed about 0.3% unreacted components (based on polymer) and no detectable dicyclopentadiene.

ILLUSTRATIVE EMBODIMENT VII

By a procedure substantially similar to that of Illustrative Embodiment V, 27.7 g of 2,4-divinylbicyclo[3.3.0]oct-6-ene, i.e., the compound of the formula

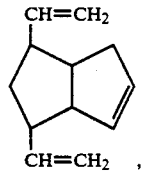

and 23.1 g of distilled dicyclopentadiene were heated at 240° C. for 4 hours. Gas chromatographic analysis of the resulting mixture indicated a 77% conversion of the divinylbicyclo[3.3.0]oct-6-ene to give an adduct mixture containing a 5.5 ratio by weight of adducts of 2,4-divinylbicyclo[3.3.0]oct-6-ene and cyclopentadiene to cyclopentadiene oligomers. The adduct mixture was a yellow, viscous liquid.

ILLUSTRATIVE EMBODIMENT VIII

By a procedure similar to that of Illustrative Embodiment VI, a 1.5 g sample of an adduct mixture of 2,4-divinylbicyclo[3.3.0]oct-6-ene and cyclopentadiene produced according to the procedure of Illustrative Embodiment VII was mixed in a degassed serum bottle under nitrogen with 0.008 mmole of bis(2,6-diisopropylphenoxy)tungsten oxydichloride and 0.033 mmole of tributyltin hydride. The mixture was transferred to an aluminum mold under nitrogen and heated to 100° C. for 15 minutes to complete the polymerization. The hard polymer product was found by dynamic mechanical thermal analysis to have a glass transition temperature of approximately 206° C. The polymer had a swell in toluene (24 hours at room temperature) of 93%.

What is claimed is:

1. A process for the polymerization under ring-opening polymerization conditions of a mixture comprising a major proportion of (1) adducts of a divinyl cyclohydrocarbon compound of up to 20 carbon atoms containing two vinyl groups as substituents on carbon atoms at least one carbon atom apart on an aliphatic ring system of from 5 to 10 carbon atoms and of 1 ring or 2 fused rings and cyclopentadiene, and (2) cyclopentadiene oligomers in the presence of an olefin methathesis catalyst system and, optionally, added dicyclopentadiene.

2. The process of claim 1 wherein the divinyl cyclohydrocarbon compound is of the formula

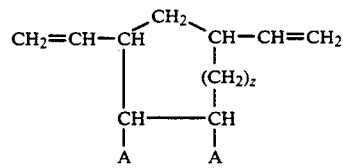

wherein z is 0 or 1 and A individually is hydrogen, alkyl of from 1 to 4 carbon atoms inclusive, or the two A groups taken together form a second valence bond between the two carbon atoms to which they are attached or a divalent linking group of from 3 to 4 carbon atoms in the bridge and up to 1 carbon-carbon double bond.

3. The process of claim 2 wherein the catalyst system comprises a di(alkylphenoxy)tungsten halide, a triorganotin compound and, optionally, a boron halide.

4. The process of claim 3 wherein the tungsten halide is of the formula

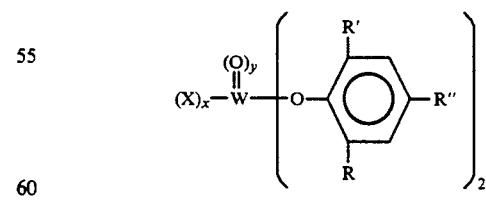

wherein R independently is alkyl of up to 10 carbon atoms inclusive, R' independently is hydrogen or R, R" independently is hydrogen or R, X is halo, x is 2 or 4 and y is 0 or 1 with the sum of x+2y being 4.

5. The process of claim 4 wherein the triorganotin halide is a trialkyltin halide wherein each alkyl independently has up to 10 carbon atoms.

6. The process of claim 5 wherein the divinyl cyclohydrocarbon is 1,3-divinylcyclopentane.

7. The process of claim 5 wherein the divinyl cyclohydrocarbon is 3,5-divinylcyclopentene.

8. The process of claim 5 wherein the divinylcyclohydrocarbon is 2,4-divinylbicyclo[3.3.0]oct-6-ene.

9. The process of claim 7 wherein the polymerization is carried out at a temperature from about 25° C. to about 200° C.

10. The process of claim 9 wherein the polymerization mixture contains at least about 60% total of adducts.

11. The process of claim 10 wherein the molar ratio of tungsten halide to tin hydride is from about 1:1 to about 1:15.

12. The process of claim 11 wherein X is chloro or bromo, R is alkyl of from 3 to 6 carbon atoms branched on the α-carbon atom, R' is R and R" is hydrogen.

13. The process of claim 12 wherein the tin hydride is a trialkyltin hydride in which each alkyl is straight-chain alkyl of from 3 to 6 carbon atoms inclusive.

14. The process of claim 13 wherein the boron halide promoter is present in an amount from about 0.05 mole to about 2 moles per mole of tungsten compound.

15. The process of claim 14 wherein the boron halide is boron trifluoride, the diethyl ether complex of boron trifluoride or the dibutyl ether complex of boron trifluoride.

16. The process of claim 13 wherein the tungsten halide is bis(2,6-diisopropylphenoxy)tungsten oxydichloride.

17. The process of claim 16 wherein the tin hydride is tributylin hydride.

18. The hard, infusible polymeric product produced by the process of claim 1.

19. The hard, infusible polymeric product produced by the process of claim 6.

20. A polymerizable mixture of (1) adducts of a divinyl cyclohydrocarbon compound of up to 20 carbon atoms, inclusive, containing two vinyl groups as substituents on carbon atoms at least one carbon atom apart on an aliphatic ring system of from 5 to 10 carbon atoms and 1 ring or 2 fused rings and cyclopentadiene, and (2) cyclopentadiene oligomers, optionally in the presence of dicyclopentadiene.

21. The mixture of claim 20 wherein the divinyl cyclohydrocarbon compound is of the formula

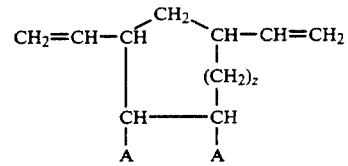

wherein z is 0 or 1 and A individually is hydrogen, alkyl of from 1 to 4 carbon atoms inclusive, or the two A groups taken together form a second valence bond between the two carbon atoms to which they are attached or a divalent linking group of from 3 to 4 carbon atoms in the bridge and up to 1 carbon-carbon double bond.

22. The mixture of claim 21 wherein the divinyl cyclohydrocarbon compound is 3,5-divinylcyclopentene.

23. The mixture of claim 21 wherein the divinyl cyclohydrocarbon compound is 1,3-divinylcyclopentane.

24. The mixture of claim 21 wherein the divinyl cyclohydrocarbon is 2,4-divinylbicyclo[3.3.0]oct-6-ene.

25. A process for providing the adduct mixture of claim 20 comprising contacting the divinylcyclohydrocarbon and dicyclopentadiene at a temperature of at least about 160° C. and such that the molar ratio of divinylcyclohydrocarbon to dicyclopentadiene is from about 0.5 to about 2.

26. The process of claim 25 wherein the divinylcyclohydrocarbon is 3,5-divinylcyclopentene.

27. The process of claim 25 wherein the divinylcyclohydrocarbon is 1,3-divinylcyclopentane.

28. The process of claim 25 wherein the divinylcyclohydrocarbon is 2,4-divinylbicyclo[3.3.0]oct-6-ene.

* * * * *